TELEVISION RECEIVER

Filed Feb. 27, 1956

2 Sheets-Sheet 1

ROBERT ADLER
JOHN G. SPRACKLEN
*INVENTORS.*

BY John J. Pederson

THEIR ATTORNEY.

Dec. 1, 1959 R. ADLER ET AL 2,915,583

TELEVISION RECEIVER

Filed Feb. 27, 1956 2 Sheets-Sheet 2

ROBERT ADLER
JOHN G. SPRACKLEN
*INVENTORS.*

BY John J. Pederson

THEIR ATTORNEY.

United States Patent Office 2,915,583

Patented Dec. 1, 1959

2,915,583

TELEVISION RECEIVER

Robert Adler, Northfield, and John G. Spracklen, Chicago, Ill., assignors to Zenith Radio Corporation, a corporation of Delaware Application February 27, 1956, Serial No. 568,049

5 Claims. (Cl. 178—7.3)

This invention is directed to a new and improved television receiver and is particularly concerned with an automatic gain-control and synchronizing-signal separation system for a television receiver.

Impulse noise has long been a source of difficulty in the operation of television receivers, particularly in weak-signal or so-called "fringe" areas. The noise pulses are generally of very short duration but of much greater amplitude than the synchronizing-signal pulse components of the composite video signal; as a result, noise pulses occurring during video-signal intervals may cause black spots or streaks in the reproduced image. A greater difficulty is presented by the fact that the extraneous noise pulses are also applied to the synchronizing system and may result in false synchronization or complete loss of synchronization. This difficulty has been largely overcome in many commercial television receivers by means of a noise-immune synchronizing signal separator comprising a multi-grid tube; the tube operates as a self-biased clipping amplifier for a positive-polarity composite video signal applied to one control grid. At the same time, a negative-polarity composite video signal is applied to a positively biased control grid preferably located intermediate the cathode and the principal control grid; noise pulses in this negative-polarity signal interrupt the flow of space current to the output electrode in time coincidence with the occurrence of the corresponding noise impulses in the positive-polarity signal. This noise-gating action substantially eliminates noise pulses in the output signal of the synchronizing-signal separator and provides stable operation of the line- and field-frequency scanning systems of the receiver.

In a noise-immune sync separator of the type described, a variable impedance is usually provided in the negative-polarity or noise-gating input circuit to permit adjustment of the sync clipper for strong and weak signal operation. When this impedance is adjusted for maximum noise protection under weak-signal conditions, however, the receiver may be falsely synchronized in a split-phase condition if it is switched to a strong-signal channel. It has been determined that this false synchronization is directly attributable to the conjoint use of a time-gated automatic gain-control system of the conventional type in the receiver.

Another type of noise-gated synchronizing-signal separator is described in the co-pending application of Robert Adler, Serial No. 314,373, filed October 11, 1952, now Patent No. 2,814,671, granted Nov. 26, 1957, and assigned to the same assignee as the present invention. This system, which employs a specialized beam-deflection tube aperture-gated to develop both AGC and synchronizing-control signals, effectively avoids false synchronization of the type noted above. The beam-deflection tube employed, however, is not easily adapted to other circuit uses and consequently may be more expensive than desired.

It is an object of the invention, therefore, to provide a new and improved automatic gain-control and synchronizing signal separation system which is in all respects essentially noise-immune.

It is a more specific object of the invention to provide a television receiver sync-separation and gain-control system which is not subject to false synchronization and is essentially undisturbed by extraneous noise impulses.

It is another object of the invention to combine the sync-separation and gain-control functions of a television receiver in a single system requiring but one relatively simple and economical intensity-control electron-discharge tube.

The invention is adapted for use in a television receiver comprising a source of a negative-polarity composite video signal and a source of a similar positive-polarity composite video signal; in most receivers, these sources comprise the second detector and first video amplifier stages respectively. A noise-immune gain-control and synchronizing-signal separation system constructed in accordance with the invention includes a gain-control electron-discharge system including a cathode, a first intensity-control electrode, a second intensity-control electrode, and an output electrode; the system further includes a similar synchronizing-signal separation electron-discharge system. Means are provided for applying the negative-polarity composite video signal to the first control electrodes of the two discharge systems and for applying the positive-polarity composite video signal to the second control electrodes of the two discharge systems in time coincidence with the negative-polarity video signal. A D. C. coupling circuit is utilized in applying the positive-polarity composite video signals to the second control electrode of the gain-control discharge system. A first output circuit is coupled to the output electrode of the gain-control discharge system; this first output circuit includes an integrating network for developing a gain-control potential representative of the average amplitude level of synchronizing-signal portions of the composite video signal. A second output circuit is coupled to the output electrode of the synchronizing-signal separation discharge system for developing a synchronizing-control signal representative of the phase and frequency of the synchronizing-signal portions of the composite video signal.

The features of the present invention which are believed to be novel are set forth with particularity in the appended claims. The organization and manner of operation, together with further objects and advantages thereof, may best be understood by reference to the following description taken in conjunction with the accompanying drawings, in which like reference numerals refer to like elements in the several figures, and in which:

Figure 1:
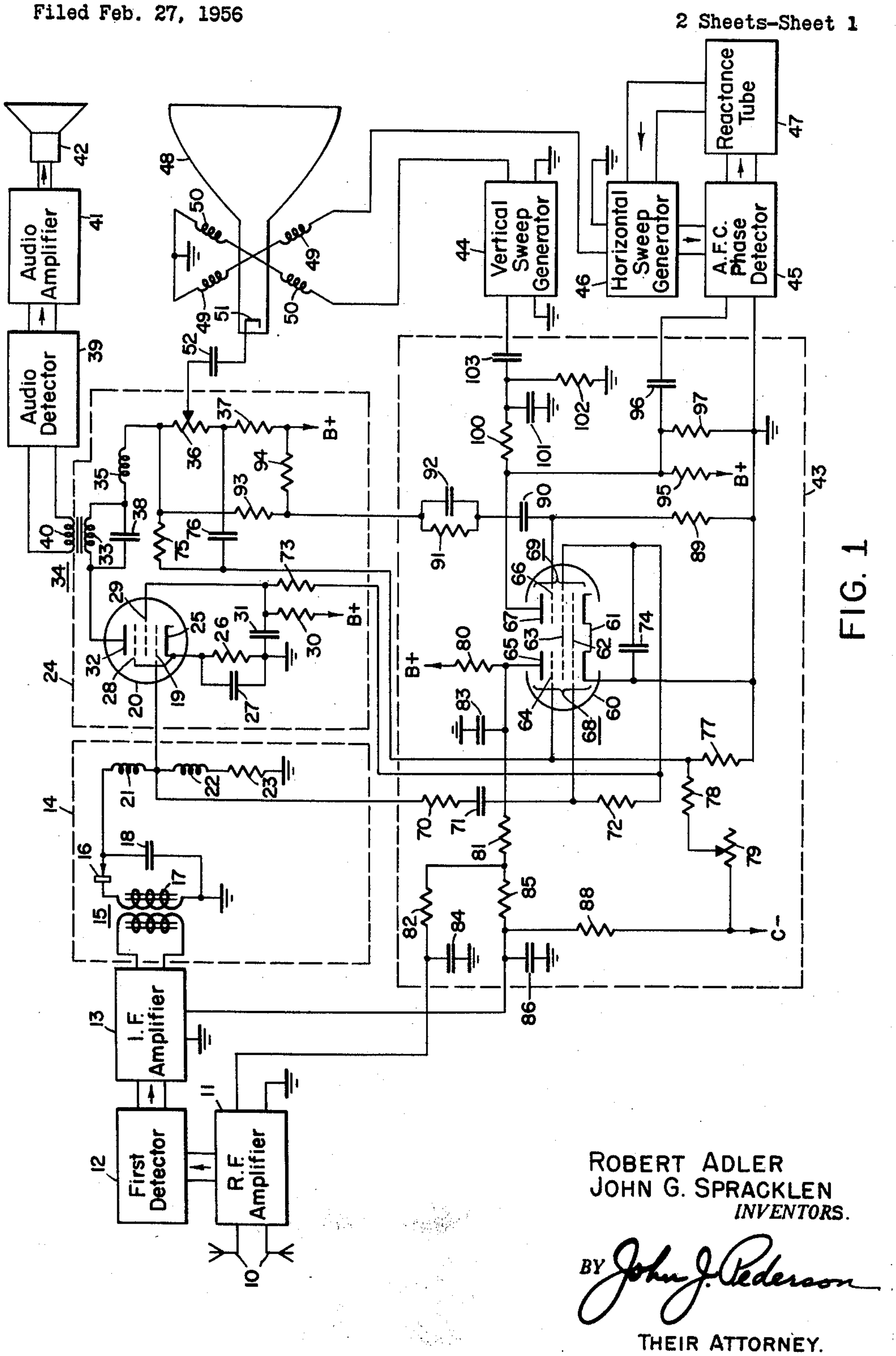
Figure 1 is a schematic diagram of a television receiver including a noise-immune gain-control and synchronizing-signal separation system constructed in accordance with one embodiment of the invention.

The television receiver shown in Figure 1 comprises an antenna 10 coupled in conventional manner to a radio-frequency amplifier 11 which, in turn, is coupled to a heterodyning stage or first detector 12. First detector 12 is coupled to an intermediate-frequency amplifier 13 of any desired number of stages. The IF amplifier is coupled to a second detector stage, indicated by dash outline 14, including a coupling transformer 15. The second detector circuit is of conventional form and comprises a diode 16 having its cathode connected to one terminal of the secondary winding 17 of transformer 15;

the other terminal of winding 17 is grounded. The anode of diode 16 is bypassed to ground for intermediate-frequency components by means of a capacitor 18; the anode of the diode is also coupled to the control electrode 19 of an amplifier tube 20 by means of a peaking coil 21. The amplifier control grid is returned to ground through a circuit comprising a series-connected coil 22 and resistor 23.

Tube 20 constitutes the amplifier tube of a video amplifier circuit 24; like detector circuit 14, amplifier 24 is of generally conventional construction. The cathode 25 of the amplifier tube is connected to ground through a biasing network comprising a resistor 26 and a shunt capacitor 27. The suppressor electrode 28 of the tube is directly connected to cathode 25. The screen electrode 29 of amplifier tube 20 is connected to a suitable source of positive unidirectional operating potential B+ by means of a resistor 30 and is bypassed to ground by a capacitor 31. The anode 32 of tube 20 is connected to D.C. source B+ through a series-connected circuit comprising the primary winding 33 of a transformer 34, a peaking coil 35, a contrast control potentiometer 36 and a load resistor 37. A capacitor 38 is connected across transformer primary 33 to form a parallel-resonant circuit which is tuned to a frequency corresponding to the difference between the video-signal carrier frequency and the sound-signal carrier frequency to derive intercarrier sound signals which are supplied to an audio detector 39 through the secondary 40 of transformer 34. Audio detector 39 is coupled to an audio amplifier 41 of any desired number of stages; the audio amplifier is in turn connected to a suitable loudspeaker 42.

The receiver of Figure 1 further includes a gain-control and synchronizing-signal separation system 43 which is coupled to both second detector 14 and video amplifier 24 in a manner to be described more completely hereinafter. The AGC potentials developed in system 43 are supplied to radio-frequency amplifier 11 and to IF amplifier 13. Additional output circuits from system 43 are coupled to a vertical or field-frequency sweep signal generator 44 and to an automatic-frequency-control phase detector 45. Phase detector 45 is also coupled to the output of a horizontal or line-frequency sweep generator 46; the output of the phase detector is applied to a reactance tube 47 which is in turn coupled to horizontal sweep generator 46. Sweep generators 46 and 44 are coupled to the deflection system of an image reproducer 48, here represented schematically as deflection coils 49 and 50. The cathode 51 of picture tube 48 is coupled to contrast control potentiometer 36 through a coupling capacitor 52. For convenience, the remaining elements of the electron gun of picture tube 48 have been omitted from the drawing.

As thus far described, the television receiver of Figure 1 is entirely conventional; accordingly, only a very brief description of its operational characteristics is desirable here. A transmitted signal is intercepted at antenna 10, amplified in circuit 11 and applied to first detector 12 wherein it is heterodyned to a suitable intermediate frequency. The intermediate frequency signal is amplified in circuit 13 and applied to diode 16 in second detector 14 through the input transformer 15. Second detector 14 develops a negative-polarity composite video signal which is utilized to control amplifier tube 20 in video amplifier circuit 24. The composite video signal is amplified and inverted in phase in video amplifier 24 and supplied to the cathode 51 of image reproducer 48 to intensity-modulate the electron beam of the picture tube in the usual manner. The intercarrier sound signals derived in tuned circuit 33, 38 are supplied to the audio system comprising units 39, 41 and 42 and are utilized to reproduce the sound portion of the television program. The synchronizing signal components of the composite video signal are separated in system 43 and supplied to the sweep signal generating circuits 44—47 of the receiver to control the scanning signals generated therein; these scanning signals are in turn supplied to deflection yoke 49, 50 to control the deflection of the electron beam across the image screen of picture tube 48. System 43 also generates AGC potentials which are applied to amplifiers 11 and 13 to control the amplitude level of the intermediate-frequency signal supplied to detector 14.

The AGC and sync separator system 43 of the invention comprises an electron-discharge device 60 preferably constructed as a semi-divided pentode. Tube 60 includes a cathode 61, a first control electrode 62, a screen electrode 63, a second control electrode 64, and a first anode or output electrode 65. The tube further includes an additional second control electrode 66 associated with a second anode 67. Tube 60 thus comprises two distinguishable electron-discharge systems: a gain-control discharge system 68 including electrodes 61—65 and a synchronizing-signal separation discharge system 69 comprising electrodes 61—63, 66 and 67, the cathode, first control and screen electrodes being common to the two systems. Structurally, tube 60 is essentially similar to a conventional pentode except that the third grid and anode electrodes have each been divided into two segments and that the two segments of the third grid are wound with turns spaced closely enough to obtain high transconductance.

First control electrode 62, which is common to discharge systems 68 and 69, is coupled to second detector 14 by means of a series RC circuit comprising a resistor 70 and a coupling capacitor 71. The first control electrode is also connected to a biasing circuit comprising a pair of series-connected resistors 72 and 73 connected to D.C. source B+ through screen grid resistor 30 of video amplifier 24. Cathode 61 is grounded and screen grid 63 is connected to B+ through resistors 73 and 30, the screen grid being bypassed to ground through a capacitor 74.

The second control electrode 64 of gain-control discharge system 68 is coupled to the output circuit of video amplifier 20 by means of a D.C. coupling circuit comprising a resistor 75 connected between electrode 64 and one terminal of contrast control potentiometer 36 and an A.C. coupling circuit comprising a capacitor 76 connected between the control electrode and the other terminal of the contrast control. Control electrode 64 is also connected to a voltage-divider biasing circuit comprising a resistor 77, connected between electrode 64 and ground, and a resistor 78 and a variable resistor 79, connected in series with each other between electrode 64 and a source of negative unidirectional operating potential C—.

Anode 65 of the gain-control discharge system is connected to D.C. source B+ through a resistor 80. Anode 65 is further connected to radio-frequency amplifier 11 by means of an integrating circuit including a pair of series-connected resistors 81 and 82 and a pair of capacitors 83 and 84 connecting the resistors to ground. A similar output circuit couples anode 65 to IF amplifier 13; this circuit includes a resistor 85 connected in series with resistor 81 between anode 65 and the IF amplifier and a capacitor 86 connecting the terminal 87 of resistor 85 opposite resistor 81 to ground. The output circuitry for the gain-control discharge system also includes a resistor 88 connected between terminal 87 and negative D.C. source C—.

The second control electrode 66 of sync-separation discharge system 69 is coupled to the output circuit of video amplifier 20 by means of an A.C. coupling circuit comprising a coupling capacitor 90 connected in series with a parallel RC circuit including a resistor 91 and a capacitor 92, the other end of the RC circuit being connected to a voltage divider comprising a pair of resistors 93 and 94 connected across resistors 36 and 37. Control electrode 66 is also returned to ground through a resistor 89. Output electrode 67 of the syn-separation discharge system is connected to D.C. source B+ by means of a resistor 95 and is also coupled to AFC phase detector 45 by means of a coupling capacitor 96; a load resistor 97 is connected between anode 67 and ground. An additional output circuit for the synchronizing signal discharge system comprises a coupling resistor 100 having one terminal connected to anode 67 and the other terminal bypassed to ground through a capacitor 101; the aforesaid other terminal of resistor 100 is also connected to ground through a resistor 102 and to vertical sweep generator 44 by means of a coupling capacitor 103.

In operation, AGC and sync separation system 43 is in some respects quite similar to the noise-immune sync separation circuits now in widespread use in the television industry and described briefly above; a detailed description of the structure and operation of a system of this type is described in an article entitled, "An Economical Noise Immune Sync Clipper" by M. Marks at pp. 124–127 of the journal "Electronics" for April 1952. This syn-separation system is also described and claimed in the copending application of R. Adler and M. Marks, Serial No. 230,472, filed June 8, 1951, now Patent No. 2,814,671, granted November 26, 1957, and assigned to the same assignee as the present invention. Nevative-polarity composite video signals are applied to first control electrode 62 from second detector 14; the positive bias potential on control grid 62 is established at a level such that the electron flow is cut off on the high-amplitude noise impulses but is not affected by normal video modulation or synchronizing signal pulses in the composite video signal.

The A.C. components of the positive-polarity composite video signal are applied to second control electrode 66 of sync-separation discharge system 69 in time coincidence with the negative-polarity signal applied to control electrode 62. Condenser 90 and resistor 89 in the input circuit of control electrode 66 are selected to establish the control electrode at a self-bias potential substantially negative with respect to cathode 61 so that discharge system 69 operates as a clipping amplifier and supplies a synchronizing-control signal comprising pulses representative of the phase and frequency of the synchronizing-signal portions of the composite video signal to the two output circuits coupled to anode 67. In this respect, the system operates in essentially the same manner as the synchronizing-signal separation systems described in the Marks article and the Adler et al. application.

Both the A.C. and D.C. components of the positive-polarity composite video signal are applied to second control electrode 64 of AGC discharge system 68 in time coincidence with the negative-polarity signal applied to control electrode 62. Control electrode 64 is biased negatively with respect to cathode 61 by the biasing circuit comprising resistors 77—79 and negative D.C. source C—; consequently, the AGC discharge system also operates as a clipping amplifier. The signal appearing at anode 65 is representative of the peak amplitude level of the synchronizing-signal portions of the composite video signal. No signal at all appears on anode 65 until the composite video signal exceeds a predetermined peak amplitude. Beyond this threshold the signal produced on anode 65 increases rapidly. This output signal is integrated to develop gain-control potentials which are applied to amplifiers 11 and 13 to adjust the amplification levels in those circuits in accordance with received signal strength.

Noise impulses appearing in both the negative and positive-polarity video signals are not translated to the sweep-signal generating system comprising circuits 44—47, since conduction in tube 60 is cut off whenever these noise impulses appear in the negative-polarity signal applied to control electrode 62. Of course, an occasional synchronizing pulse may be lost whenever it occurs in time coincidence with a high-amplitude noise impulse, but the flywheel action of sweep generators 44 and 46 prevents loss of synchronization when this occurs. At the same time, and by the same mechanism, the AGC system comprising discharge system 68 is also rendered essentially noise-immune.

Because the AGC circuit of system 43 does not employ the conventional time-gating, the receiver cannot be falsely synchronized in a split-phase condition. Moreover, the system is essentially simplified as compared to some conventional arrangements, since the AGC and sync-separation functions are combined in the single tube 60 and the noise gating action for both AGC and sync separation is accomplished with a single signal applied to first control electrode 62. Another important effect achieved in the AGC portion of system 43 is derived from the use of noise gating in this portion of the circuit; because the tube is cut off by noise impulses, the amplitude of the AGC potential is decreased under heavy noise conditions rather than increased as would be the case with a time-gating arrangement. As a consequence, a stronger signal is developed and applied to the image reproducer under adverse noise conditions, thus enabling presentation of a more intelligible image. Because tube 60 may be essentially similar in construction to a conventional pentode, except for the sectionalization of the anode and what would normally be the suppressor electrode, the tube is relatively economical to manufacture. The amplitude levels of the output signals from the AGC and sync-separation portions of system 43 are essentially independent of each other, thus permitting a constant-amplitude signal input to the sweep-signal generating system 44—47 despite wide variations in AGC potential. The amplification provided by AGC discharge system 68 gives a much more effective and sensitive control than would be possible with any arrangement in which the sync separator is used for AGC purposes. It is not necessary to adjust AGC and synchronizing-separation system 43 for strong or weak signal operation, since the overall system inherently provides maximum noise protection at all times independently of the strength of the received signal.

The embodiment of Figure 1 is essentially similar to the circuitry of a commercialized version of the invention; suitable circuit impedance values and other parameters are set forth below. It will be understood that this material is included purely by way of illustration and in no sense as a limitation on the invention.

| | |
|---|---|
| Tube **60** | Commercially available under type designation **6BU8**. |
| B+ | +250 volts. |
| C— | —75 volts. |
| Resistor **70** | 47 kilohms. |
| Resistor **72** | 2.7 megohms. |
| Resistor **77** | 680 kilohms. |
| Resistor **78** | 360 kilohms. |
| Resistor **79** | 350 kilohms maximum. |
| Resistor **72** | 2.7 megohms. |
| Resistor **89** | 3.3 megohms. |
| Resistor **80** | 3.3 megohms. |
| Resistor **81** | 1 megohm. |
| Resistor **82** | 2.2 megohms. |
| Resistor **85** | 100 kilohms. |
| Resistor **88** | 2.2 megohms. |
| Resistor **95** | 220 kilohms. |
| Resistor **97** | 100 kilohms. |
| Resistor **100** | 390 kilohms. |
| Capacitor **71** | 0.1 microfarad. |
| Capacitor **83** | 0.1 microfarad. |
| Capacitor **84** | .01 microfarad. |
| Capacitor **86** | 0.15 microfarad. |
| Capacitor **90** | 0.0033 microfarad. |

Figure 2:
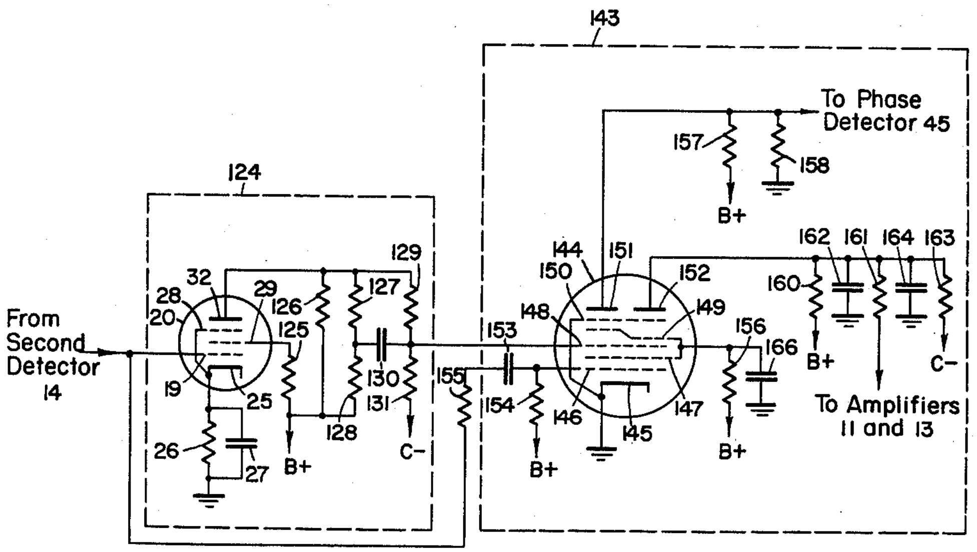
Figure 2 is a schematic diagram of another embodiment of the invention.

Figure 2 illustrates, in somewhat simplified form, another embodiment of the invention utilizing a different type of electron-discharge device in the AGC and sync separation system. This circuit is also specifically intended for use in a television receiver; however, with the exception of the video amplifier, all of the receiver circuitry may be essentially similar to that illustrated in Figure 1 and has consequently been omitted from the drawing. In the embodiment of Figure 2, the negative-polarity composite video signal from second detector 14 is again applied to the control electrode 19 of a video amplifier tube 20 which is included in a video amplifier circuit 124. The cathode 25 of amplifier tube 20 is connected to ground through a biasing circuit comprising resistor 26 and bypass capacitor 27. The screen grid 29 of pentode 20 is connected to positive unidirectional operating potential source B+ through a resistor 125; the suppressor 28 of the tube is connected to cathode 25. The anode 32 of the video amplifier tube is connected to B+ through a resistor 126 and is also connected to an output circuit including a pair of series-connected resistors 127 and 128 connected across resistor 126. The output circuit further includes a resistor 129 having one terminal connected to anode 32 and a coupling capacitor 130 connected between the other terminal of resistor 129 and the junction of resistors 127 and 128. A resistor 131 is connected between resistor 129 and a source of negative unidirectional operating potential C—.

The embodiment of Figure 2 further includes a gain-control and sync-separation system 143 which is in most respects similar to system 43 of Figure 1 but utilizes a different type of electron-discharge device. The discharge device 144 includes a cathode 145, a first control electrode 146, a first screen grid 147, a second control electrode 148, a second screen grid 149, a suppressor electrode 150, and two output electrodes 151 and 152. Tube 144 thus comprises a semi-divided pentagrid tube which is essentially similar to conventional pentagrid devices except that it includes two independent anodes; in addition, the structure of second screen electrode 149 is somewhat modified as will be explained more completely hereinafter.

Cathode 145 is connected to ground and suppressor electrode 150 is directly connected to the cathode. First control electrode 146 is coupled to the source of negative-polarity composite video signals, second detector 14, by means of an input circuit including a resistor 155 connected in series with coupling capacitor 153 and a biasing circuit comprising a resistor 154 connected between the control electrode and D.C. source B+. Screen electrodes 147 and 149 are connected to each other and are connected to B+ through a resistor 156; the screen electrodes are bypassed to ground through a capacitor 166. Second control electrode 148 is directly connected to the output circuit of video amplifier 124 at the common terminal of circuit elements 129—131.

Output electrode 151 is connected to D.C. source B+ through a resistor 157 and is returned to ground through a resistor 158; anode 151 is also coupled to phase detector 45 (see Figure 1). Anode 152 is connected to B+ through a resistor 160 and is also connected to an integrating output circuit comprising a series resistor 161 and a pair of shunt capacitors 162 and 164, the terminal of resistor 161 remote from anode 152 being connected to amplifiers 11 and 13 (see Figure 1). Anode 152 is also returned to negative source C— through a resistor 163.

For optimum performance, it is desirable that the AGC and sync separation tube 144 be constructed to provide different transfer characteristics for second control electrode 148 with respect to the two different anodes. This objective may be achieved by making the spacing between control electrode and screen grid 149 substantially larger in the region intermediate control electrode 148 and anode 151 than in the region between that control electrode and anode 152. The tube may thus be constructed to obtain the transfer characteristics illustrated in Figure 3, in which current drawn by the two anodes is plotted as a function of the potential of control electrode 148. Substantially the same effect may be achieved by constructing control electrode 148 in two sections, using a substantially closer-knit grid structure (a substantially greater number of turns per unit length in the usual wound-wire grid) in the section adjacent anode 152 than in that associated with anode 151. By using this asymmetrical tube construction, the cutoff point on the transfer characteristic 171 for anode 151 may be made substantially lower than that for anode 152, which is illustrated by curve 172. When a composite video signal with positive-polarity synchronizing pulses is applied to control electrode 148 with an amplitude such that the sync tips, illustrated by curve 174, reach at least to the center of transfer characteristic 172, the sync tips extend into the constant-current region of transfer characteristic 171, thus resulting in clipping of any portion of the sync pulse greater than that required to reach the knee of transfer characteristic 171. The depth of clipping is determined by the voltage difference between the knee of transfer characteristic 171 and the center of the slope of transfer characteristic 172. It is thus apparent that the peak of the applied signal 174 may fall anywhere between the limits indicated by points 175 and 176 in Figure 3, these limits corresponding to weak and to very strong received signals respectively, without changing the amplitude of the synchronizing signal supplied to phase detector 45 even though a substantial variation in the control potential applied to amplifiers 11 and 13 is achieved.

Figure 3:
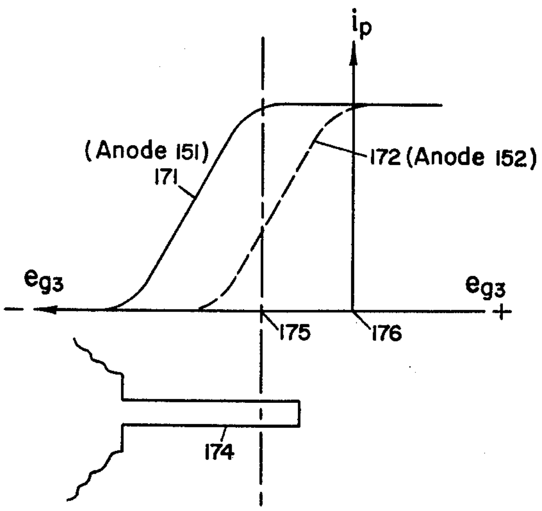
Figure 3 is an explanatory diagram illustrating the operating characteristics of an electron-discharge device of the embodiment of Figure 2.

In other respects, operation of the embodiment of Figure 2 is generally similar to that of Figure 1. The negative-polarity composite video signal from second detector 14 is applied to control electrode 146, which is suitably biased so that conduction in tube 144 is cut off whenever large-amplitude noise impulses occur in the video signal. The amplified positive-polarity composite video signal developed in video amplifier 124 is applied to second control electrode 148, through the A.C. coupling circuit comprising capacitor 130 and the D.C. coupling circuit comprising resistor 129, in time coincidence with the negative-polarity signal applied to the first control electrode. Second control electrode 148 is biased negatively with respect to cathode 148 in order to obtain the desired clipping action in tube 144, as indicated in Figure 3; in the circuit of Figure 2, this is accomplished by returning grid 148 to C—. The difference in transfer characteristics of control electrode 148 with respect to anodes 151 and 152 permits effective operation of the tube for both AGC and sync-separation purposes and provides an effective operating range in which the sync-signal output is essentially constant in amplitude despite variations in the AGC control potential level. Although the structure of tube 144 is somewhat different from that of conventional tubes, the differences are not of the type which would add substantially to the cost of the tube as compared with conventional pentagrid devices. Like the embodiment of Figure 1, it is not necessary to adjust AGC and sync-separation system 143 for strong or weak signal operation, since the overall system inherently provides maximum noise protection at all times regardless of the strength of the received signal and is not subject to false synchronization in a split-phase condition.

While particular embodiments of the present invention have been shown and described, it will be obvious to those skilled in the art that changes and modifications may be made without departing from the invention in its broader aspects. Accordingly, the aim in the appended claims is to cover all such changes and modifications as may fall within the true spirit and scope of the invention.

We claim:

1. In a television receiver including a source of a negative-polarity composite video signal and a source of a similar positive-polarity composite video signal, a noise-immune gain-control and synchronizing-signal separation system comprising: a gain-control electron-discharge system including a cathode, a first intensity-control electrode, a second intensity-control electrode, and an output electrode; a synchronizing-signal separation electron-discharge system including a cathode, a first intensity-control electrode, a second intensity-control electrode, and an output electrode; means for applying said negative-polarity composite video signal to said first control electrodes of said two electron-discharge systems; means for applying said positive-polarity composite video signal to said second control electrodes of said two electro-discharge systems in time coincidence with said negative-polarity video signal, said last-mentioned means including a D.C. coupling circuit between said source of positive-polarity composite video signal and said second control electrode of said gain-control discharge system; means including an output circuit coupled to said output electrode of said gain-control discharge system and comprising an integrating network for developing a gain-control potential representative of the amplitude level of synchronizing-signal portions of said composite video signal; and means including an output circuit coupled to said output electrode of said synchronizing-signal separation discharge system for developing a synchronizing-control signal representative of the phase and frequency of said synchronizing-signal portions of said composite video signal.

2. In a television receiver including a source of negative-polarity composite video signal and a source of a similar positive-polarity composite video signal, a noise-immune gain-control and synchronizing-signal separation system comprising: a gain-control electron-discharge system including a cathode, a first intensity-control electrode, a second intensity-control electrode, and an output electrode; a synchronizing-signal separation electron-discharge system including a cathode, a first intensity-control electrode, a second intensity-control electrode, and an output electrode; means for applying said negative-polarity composite video signal to said first control electrodes of said two electron-discharge systems; means for applying said positive-polarity composite video signal to said second control electrodes of said two electron-discharge systems in time coincidence with said negative-polarity video signal, said last-mentioned means including a D.C. coupling circuit between said source of said positive-polarity composite video signals and said second control electrode of said gain-control discharge system and an A.C.-only coupling circuit between said source of positive-polarity composite video signals and said second control electrode of said synchronizing-signal separation discharge system; means including an output circuit coupled to said output electrode of said gain-control discharge system and comprising an integrating network for developing a gain-control potential representative of the amplitude level of synchronizing-signal portions of said composite video signal; and means including an output circuit coupled to said output electrode of said synchronizing-signal separation discharge system for developing a synchronizing-control signal representative of the phase and frequency of said synchronizing-signal portions of said composite video signal.

3. In a television receiver including a detector for developing a negative-polarity composite video output signal and a video amplifier driven by said detector output signal for developing a positive-polarity composite video signal, a noise-immune gain-control and synchronizing-signal separation system comprising: a semi-divided electron-discharge device including a cathode, a first intensity-control electrode, a first screen electrode, a second intensity-control electrode, a second screen electrode, a first output electrode, and a second output electrode, the geometrical configuration of one of said second control and second screen electrode being asymmetrical to establish different transfer characteristics for said second control electrode with respect to said two output electrodes; means including an A.C. coupling circuit for applying said negative-polarity composite video signal to said first control electrode; means for applying said positive-polarity composite video signal to said second control electrode in time coincidence with said negative-polarity video signal, said means including a D.C. coupling circuit between said video amplifier and said second control electrode; means including an output circuit coupled to said output electrode of said gain-control discharge system and comprising an integrating network for developing a gain-control potential representative of the average amplitude level of synchronizing-signal portions of said composite video signal; and means including an output circuit coupled to said output electrode of said synchronizing-signal separation discharge system for developing a synchronizing-control signal representative of the phase and frequency of said synchronizing-signal portions of said composite video signal.

4. In a television receiver including a source of negative-polarity composite video signal and a source of a similar positive-polarity composite video signal, a noise-immune gain-control and synchronizing-signal separation system comprising: a gain-control electron-discharge system including a cathode, a first intensity-control electrode, a second intensity-control electrode, and an output electrode; a synchronizing-signal separation electron-discharge system including a cathode, a first intensity-control electrode, a second intensity-control electrode, and an output electrode; means for appying said negative-polarity composite video signal to said first control electrodes of said two electron-discharge systems; means for biasing said first control electrodes of said two electron discharge systems to a potential at which noise impulses in said negative-polarity composite video signal in excess of the normal maximum amplitude of the synchronizing-signal components thereof effectively cut off conduction in said two discharge systems; means for applying said positive-polarity composite video signal to said second control electrodes of said two electron-discharge systems in time coincidence with said negative-polarity video signal, said last-mentioned means including a D.C. coupling circuit between said source of positive polarity composite video signals and said second control electrode of said gain-control discharge system, means for biasing said second control electrode of said gain-control discharge system to a predetermined potential negative with respect to the cathode of said discharge system, and an A.C.-only coupling circuit between said source of positive-polarity composite video signals and said second control electrode of said synchronizing-signal separation discharge system, said A.C.-only coupling circuit including self-biasing means for maintaining said second control electrode of said synchronizing-signal separation discharge system at a potential negative with respect to said cathode thereof; means including an output circuit coupled to said output electrode of said gain-control discharge system comprising an integrating network for developing a gain-control potential representative of the amplitude level of synchronizing-signal portions of said composite video signal; and means including an output circuit coupled to said output electrode of said synchronizing-signal separation discharge system for developing a synchronizing-control signal representative of the phase and frequency of said synchronizing-signal portions of sadi composite video signal.

5. A television receiver for utilizing transmitted composite television signals comprising: an image reproducing device; a scanning system for controlling the scansion of said image reproducing device; receiving circuits for translating said composite television signals; a video detector for demodulating said translated composite television signals to produce unidirectional composite video signal components and synchronizing-signal components of amplitude greater than the maximum amplitude of said video-signal components; a video amplifier coupled to said video detector for amplifying said demodulated composite television signals; a first electrode system, including a cathode, an intensity-control electrode and an output electrode, said first electrode system having a transfer characteristic comprising a control-electrode voltage range of positive transconductance followed, for control electrode voltages exceeding said positive transconductance range, by a range of substantially zero-transconductance; a second electrode system, including a cathode, an intensity-control electrode and an output electrode, said second electrode system having a transfer characteristic comprising a high-transconductance region for control-electrode voltages effectively corresponding to control-electrode voltages on said first electrode system within said substantially zero-transconductance range; means, including D.C. coupling means from said video amplifier to said control electrode of said second electrode system, for impressing said composite video signals on the control electrode of said first and second electrode systems; means including an integrating network coupled to the output electrode of said second electrode system for developing an automatic gain control potential which varies inversely with amplitude variations of said synchronizing-signal components which fall within said high-transconductance region of said second system; means for applying said automatic gain control potential to said receiving circuits to maintain said synchronizing-signal component amplitudes within said zero-transconductance control-electrode voltage range of said first electrode system; and means coupled to the output-electrode of said first electrode system for controlling said scanning system.

References Cited in the file of this patent

UNITED STATES PATENTS

| | | |
|---|---|---|
| 2,735,002 | Keizer et al. | Feb. 14, 1956 |
| 2,791,627 | Thomas et al. | May 7, 1957 |
| 2,810,783 | Gruen | Oct. 22, 1957 |
| 2,814,671 | Adler | Nov. 26, 1957 |

OTHER REFERENCES

Rider's Television Manual, Vol. 9, Zenith Chassis 21J21, Zenith TV page 9–8, Copyrighted April 29, 1952.